United States Patent [19]

Wheeler

[11] Patent Number: 5,305,854
[45] Date of Patent: Apr. 26, 1994

[54] STUFFING BOX LUBRICATOR

[75] Inventor: John H. Wheeler, Dallas, Tex.

[73] Assignee: The Texacone Company, Mesquite, Tex.

[21] Appl. No.: 763,264

[22] Filed: Sep. 20, 1991

[51] Int. Cl.$^5$ ............................................. F16N 11/04
[52] U.S. Cl. ..................................... 184/24; 184/45.1; 277/3
[58] Field of Search ................ 184/24, 25, 45.1, 45.2, 184/5.1, 5, 21, 22, 18; 277/3, 27, 58, 59, 70, 102

[56] References Cited

U.S. PATENT DOCUMENTS

| 628,846 | 10/1985 | Hough | 400/138.2 |
|---|---|---|---|
| 844,488 | 2/1907 | Weber | 91/46 |
| 943,169 | 12/1909 | Strance et al. | 277/3 |
| 947,650 | 1/1910 | Ruth | 184/25 |
| 968,132 | 8/1910 | Coyne et al. | 277/18 |
| 1,010,498 | 12/1911 | Hultgren | 184/24 |
| 1,060,303 | 4/1913 | Wittkopf | 184/24 |
| 1,415,858 | 5/1922 | Barrett | 184/24 |
| 1,507,575 | 9/1924 | Brouse | 384/149 |
| 2,094,930 | 10/1937 | Pruvot | 184/24 |
| 2,257,011 | 9/1941 | Hillier | 184/24 |
| 2,321,927 | 6/1943 | McCoy et al. | 277/70 |
| 2,567,479 | 9/1951 | Hebard | 277/3 |
| 2,572,952 | 10/1951 | Rymal | 184/24 |
| 2,628,112 | 2/1953 | Hebarb | 184/24 |
| 2,689,626 | 9/1954 | Peters | 184/24 |
| 3,165,172 | 1/1965 | Baker | 184/24 |

FOREIGN PATENT DOCUMENTS

| 0093230 | 11/1896 | Fed. Rep. of Germany | 184/24 |
|---|---|---|---|
| 0013797 | 2/1899 | Sweden | 184/24 |

Primary Examiner—Richard R. Cole
Assistant Examiner—Alan B. Cariaso
Attorney, Agent, or Firm—Michael A. O'Neil

[57] ABSTRACT

Apparatus for lubricating pistons having a pressure metered lubrication reservoir in fluid flow attachment with the piston through a lantern port in the wall of the stuffing box surrounding the piston. A check valve in fluid flow alignment between the stuffing box and the lubrication reservoir prevents the flow of spent hydraulic fluid from the stuffing box into the lubrication reservoir in the event of a seal leak or failure. A safety valve having a higher trigger pressure than the pressure of the lubricant flowing from the reservoir to the stuffing box and being in fluid flow alignment with the stuffing box and lubrication reservoir prevents the escape of lubricant flowing from the reservoir to the stuffing box, but allows the escape of spent hydraulic fluid in the event of a seal leak or failure.

9 Claims, 4 Drawing Sheets

STUFFING BOX LUBRICATOR

TECHNICAL FIELD

This invention relates to systems for lubricating hydraulic elevator piston or plunger rods, and more particularly to a stuffing box lubricator for lubricating the piston or plunger as it passes through the stuffing box.

BACKGROUND OF THE INVENTION

Hydraulic elevators employ the use of a long piston or plunger rod which supports the car of the elevator for movement through the elevator shaft. The piston or plunger is hydraulically actuated to move the car to the desired elevation. As the piston moves through an associated supporting cylinder, it passes through a sealed stuffing box at the mouth of the cylinder. To facilitate the movement of the piston or plunger rod through the stuffing box, a lubricant, such as grease, is placed in the stuffing box. As the elevator is used, the movement of the piston through the stuffing box causes the grease to get hot and the surface area of rubber seals in the stuffing box to peel off. Once the surface of the seal has peeled, the hot grease penetrates the rubber of the seal causing the seal to stick and grab the piston as it moves through the stuffing box. This phenomenon is experienced by the elevator passenger as unsettling moaning and squealing noises and jerky movement of the elevator as it travels between floors.

Noise and rough, jerky rides may also be the result of a properly functioning seal in the stuffing box. Where the stuffing box utilizes dual seals, the top seal will dry out when the lower seal is properly preventing hydraulic fluid in the cylinder from entering the stuffing box, keeping the piston dry above the lower seal. Thus, the piston does not carry spent oil or other hydraulic fluid to the upper seal, thereby allowing the upper seal to dry out. As the dry piston moves against the surface of the dry seal, the friction generates the vibration and noises experienced by the passengers. In either event, if the seals and piston are not properly lubricated, the seals deteriorate rapidly and must be frequently replaced.

Historically oil or grease has been manually applied to the exterior of the piston by an elevator workman to reduce the noise, ensure smoother movement of the piston through the stuffing box, and increase the life of the seals. The process is extremely burdensome, requiring that the elevator be taken out of service while the piston is lubricated, and is often ineffective. Additionally, the manual process must be repeated often increasing time and costs associated with maintenance of the elevator.

To overcome these problems, there have been attempts in the hydraulic elevator industry to recirculate spent oil to a reservoir surrounding and in contact with the piston surface for reapplying the oil to the piston. Such attempts have proven ineffective, inefficient, not to mention messy, and still require frequent maintenance to insure sufficient and even lubrication of the piston.

SUMMARY OF THE INVENTION

The present invention overcomes the foregoing and other problems associated with lubricating hydraulic elevator pistons by providing a lubrication device connected to the stuffing box for automatic lubrication of the piston through the elevator stuffing box. The stuffing box lubricator is connected for fluid flow through the existing stuffing box lantern port return. In a conventional hydraulic elevator, in the event of a seal leak or failure, spent hydraulic fluid is discharged through the lantern port return. Because the stuffing box lubricator of the present invention is connected to the stuffing box through the lantern port return, the lubricator is also adapted to discharge the spent hydraulic fluid in the event of a seal leak or failure without contaminating unused lubricant in the lubricator.

In a conventional stuffing box having a lantern ring sandwiched between dual seal rings, a pipe nipple of the lubricator of the present invention is installed in the lantern port return of the stuffing box. The pipe nipple is in turn connected to a pressure lubricator through a "T" coupling and a check valve for automatically supplying a mineral based lubricant containing a high level of powered Teflon through the lantern port into the stuffing box for lubricating the piston and seal rings. Connected to the pipe nipple at the remaining end of the "T" coupling is a safety return valve for release of spent hydraulic fluid and lubricant from the stuffing box. The check valve prevents passage of the spent fluid into the pressure lubricator. Thus, the stuffing box lubricator acts as both a metered lubrication system and a safety/relief system.

The continuous metered lubrication automatically lubricates the piston to prolong the life of the stuffing box seals and to prevent noises and vibration as a result of dry seals grabbing the piston. A zerk fitting allows for filling of the pressure lubricator with the mineral based Teflon lubricant. As the lubricant penetrates the pores of the piston to impregnate the piston, the amount of lubricant needed to properly lubricate the piston over a period of time is reduced. Due to the efficient utilization of the lubricant, the pressure lubricator requires refilling only about once a month, thereby reducing the time and labor required to properly lubricate the piston. Thus, not only does the stuffing box lubricator reduce the maintenance required, and increase seal life, but results in a smoother, quieter ride and happier elevator passengers.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
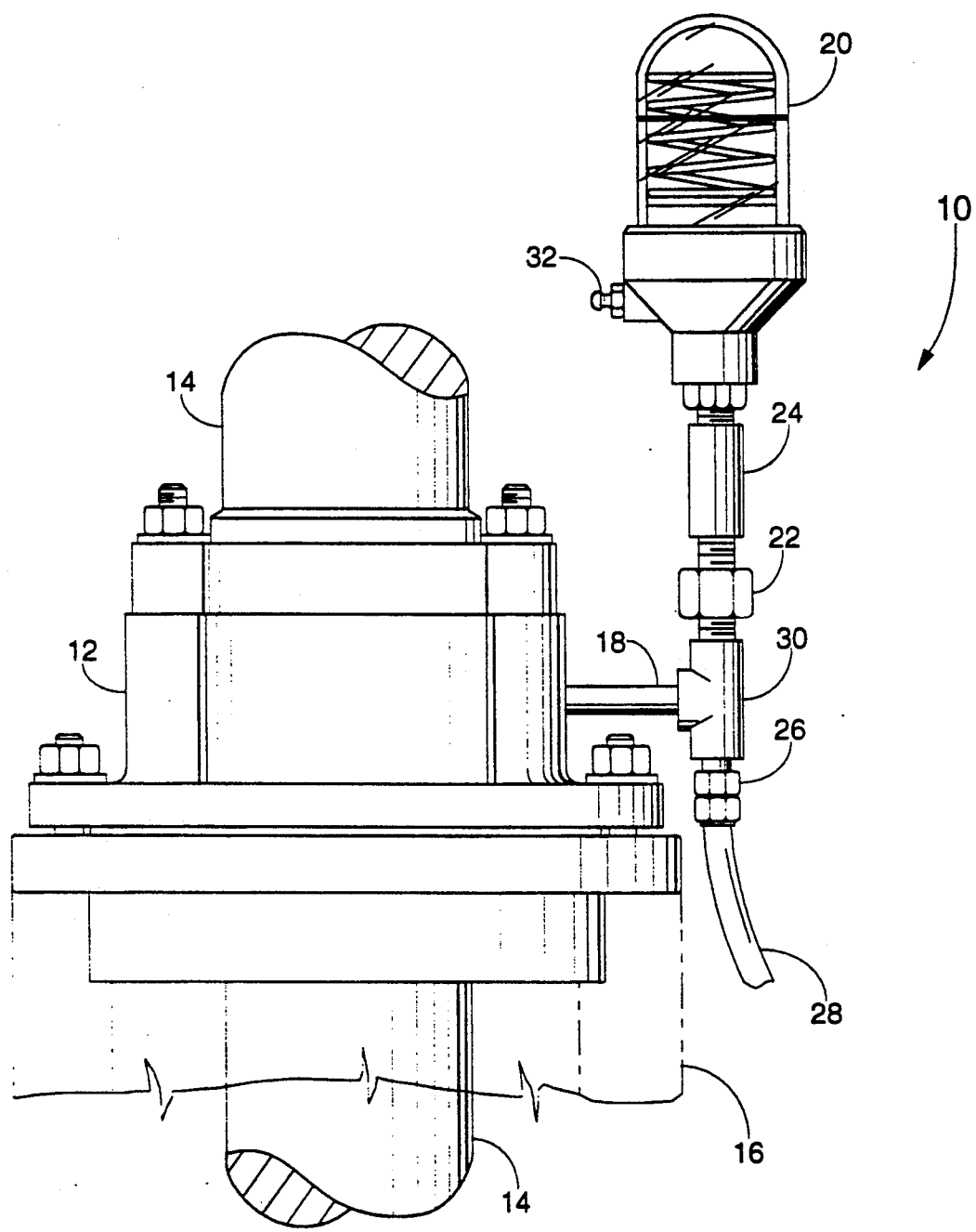
FIG. 1 is a front view of stuffing box lubricator incorporating a first embodiment of the present invention attached to an elevator stuffing box.

Referring now to the drawings, and in particular to FIG. 1, there is shown a stuffing box lubricator 10 incorporating a first embodiment of the present invention, connected to the stuffing box 12 of a hydraulic elevator for lubricating the piston 14 of the elevator. In a typical hydraulic elevator, the piston 14 passes through the stuffing box 12 as it moves in and out of an associated cylinder 16 (shown partially in phantom) under hydraulic pressure. Lubrication is applied to the piston 14 through the stuffing box 12 by the stuffing box lubricator 10.

A nipple pipe 18 connects the stuffing box lubricator 10 to the stuffing box 12. In most circumstances, the fluid flow through the nipple pipe 18 will be from an enclosed pressure lubrication reservoir 20 through the nipple pipe 18 into the stuffing box 12. However, in the event of a seal failure or leaks resulting in hydraulic fluid or excessive pressure in the stuffing box 12, spent hydraulic fluid and oil are forced out of the stuffing box 12 through the nipple pipe 18.

A check valve 22 prevents the discharged hydraulic fluid and spent oil from being forced into the lubrication reservoir 20. The check valve 22 is preferably a one to three pound check valve and is located between the nipple pipe 18 and a coupling 24, in turn connecting the check valve 22 to the lubrication reservoir 20. The spent oil and hydraulic fluid is then expelled through a relief valve 26 and out discharge tubing 28. The relief valve is preferably a twenty to twenty-five pound unidirectional valve.

As shown in FIG. 1, the stuffing box lubricator may be configured in such a way that the lubrication reservoir 20 and the relief valve 26 are in vertical alignment and extend at an angle of approximately 90 degrees from and are connected on opposed ends of a "T" coupling 30 to the nipple pipe 18. Lubricant is added to the reservoir 20 through a fitting 32.

Figure 2:
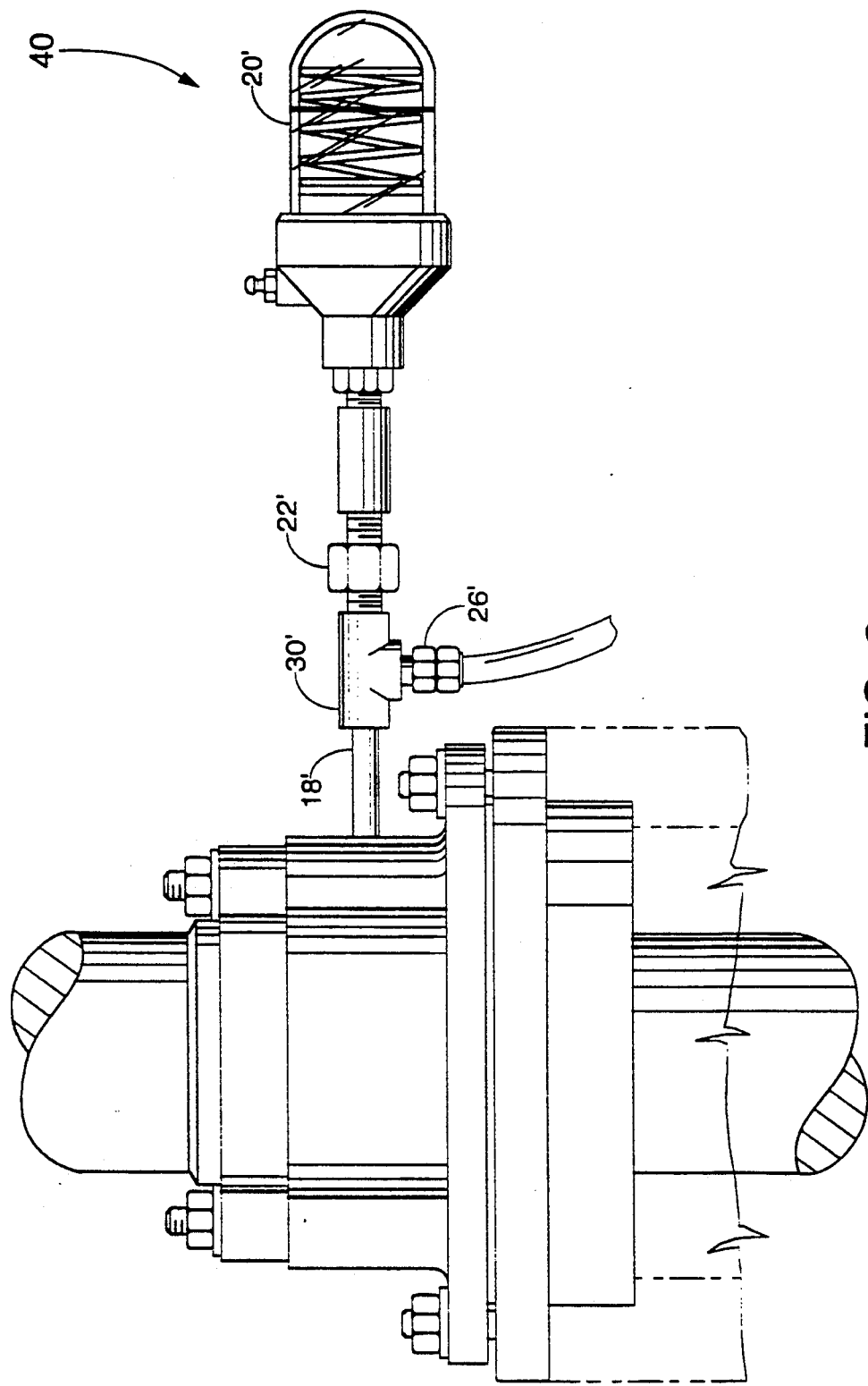
FIG. 2 is a front view of is a stuffing box lubricator incorporating a second embodiment of the present invention attached to an elevator stuffing box.

Referring now to FIG. 2, there is shown a stuffing box lubricator 40 incorporating a second embodiment of the invention. The stuffing box lubricator 40 includes component parts which are substantially identical to component parts of the stuffing box lubricator 10 of FIG. 1. Such identical component parts are designated in FIG. 2 with the same reference numerals used in conjunction with the foregoing description of the stuffing box lubricator 10, but are differentiated therefrom by a prime "'" designation. As shown in FIG. 2, the stuffing box lubricator 40 may be configured such that the nipple pipe 18' is in horizontal alignment with the lubrication reservoir 20'. The relief valve 26' extends at an angle of approximately 90 degrees from the "T" coupling 30' connecting the relief valve 26' to the check valve 22' nipple pipe 18'. In addition to the configurations shown in FIGS. 1 and 2, the stuffing box lubricator 10 may be configured as required by the available space and to facilitate filling of the lubrication reservoir 20'.

Figure 3:
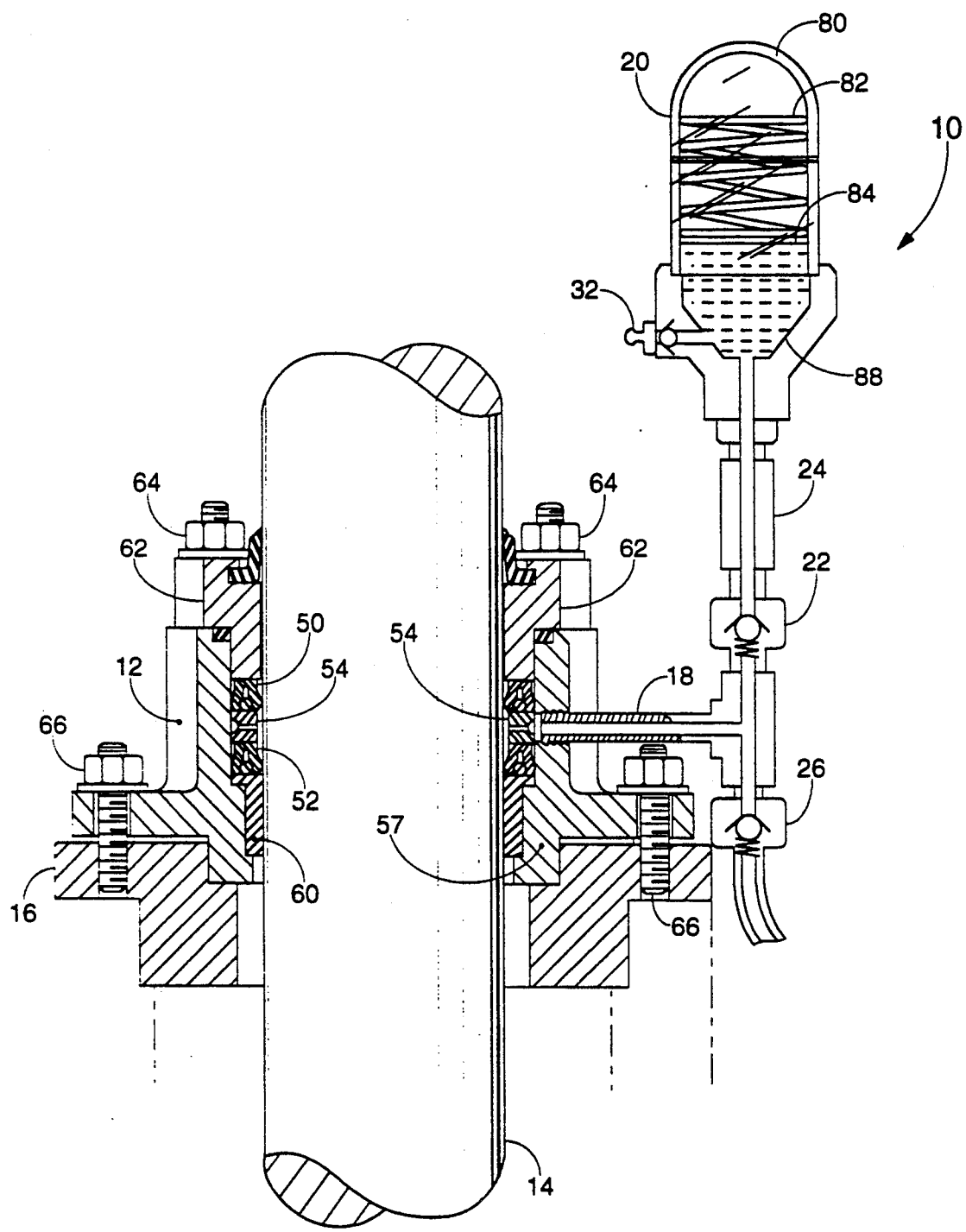
FIG. 3 is a section view of the stuffing box lubricator and elevator stuffing box of FIG. 1.

Turning now to FIG. 3, there is shown in section the stuffing box lubricator 10 and the stuffing box 12. Housed within the stuffing box 12 is an upper seal ring 50 and a lower seal ring 52. Sandwiched between the seal rings 50 and 52 is a lantern ring 54. As Shown in detail in FIG. 4, the lantern ring 54 has a channel 56 extending therethrough to allow fluid flow from the nipple pipe 18 through the channel 56 for fluid contact with the piston 14.

Figure 4:
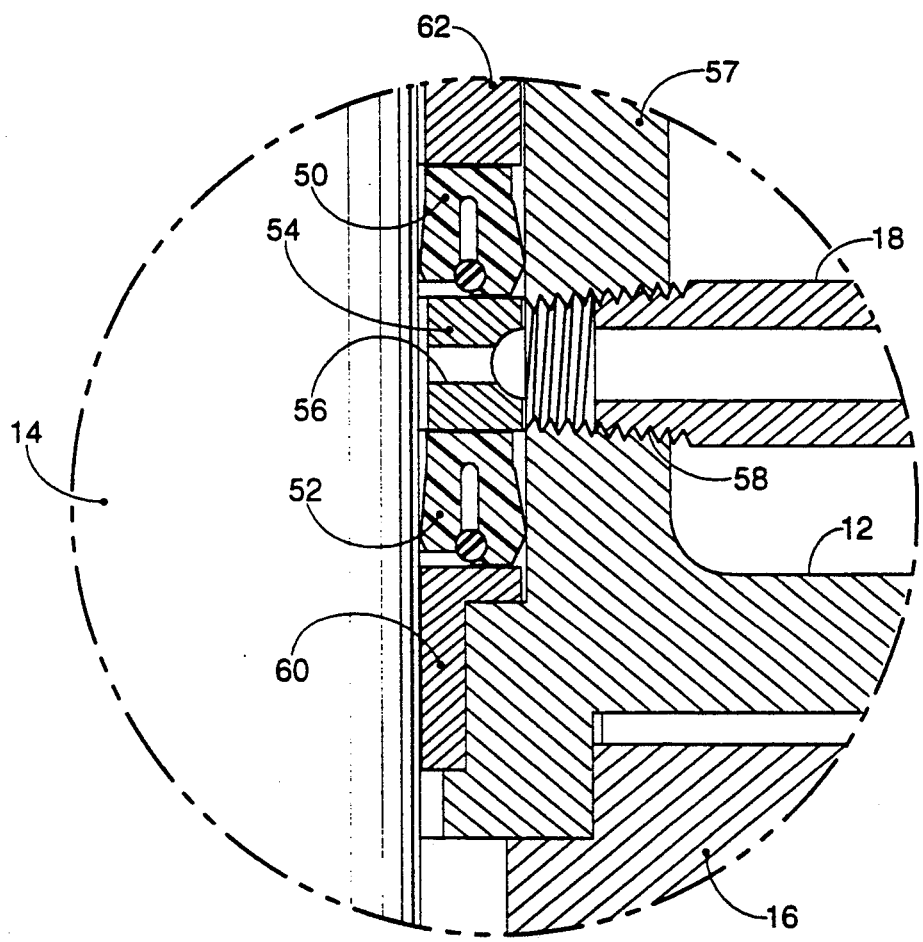
FIG. 4 is an enlarged view of the fluid flow connection between the stuffing box lubricator of FIG. 1 and the elevator stuffing box.

As shown in FIGS. 3 and 4, the nipple pipe 18 is matingly threaded into the stuffing box 12 through the stuffing box wall 57 at an existing lantern port return 58. The nipple pipe 18 is in direct alignment with the lantern ring 54 to achieve proper fluid flow from the stuffing box lubricator 10 to the piston 14. In a conventional hydraulic elevator, in the event of a seal leak or failure, spent hydraulic fluid is discharged through the lantern port return 58. Because the stuffing box lubricator 10 of the present invention is connected to the stuffing box 12 through the lantern port return 58, the lubricator 10 is adapted as described in detail above to discharge the spent hydraulic fluid in the event of a seal leak or failure without contaminating unused lubricant in the lubricator 10.

As shown FIGS. 3 and 4, in a conventional stuffing box having dual seal rings, the seal rings 50 and 52 are held in contact with the lantern ring 54. A lower position block 60 is held in contact with the lower seal ring 52 by the lower wall of the stuffing box 12. The upper seal ring 50 is held in position by an upper housing member 62 attached to the stuffing box 12 by conventional fasteners 64. The stuffing box 12 is connected to the cylinder 16 through use of conventional fasteners 66.

Referring still to FIGS. 3 and 4, as the piston 14 moves up and down through the stuffing box 12, lubricant passing through nipple pipe 18 flows through the channel 56 of the lantern ring 54 to contact the piston 14. The lubricant is preferably a mineral based lubricant having a high level of powdered teflon, although any of a number of lubricants may be used. The lubricant passes through the pores of the piston 14 to reduce the amount of lubricant required for smooth operation of the piston 14. The downward movement of the piston 14 draws the lubricant into contact with the lower seal ring 52. The lubricant prevents the seal ring 52 from drying out and prevents the surface of the seal from peeling, thereby preventing failure of the seal under the hydraulic pressure driving the piston 14 and preventing leaking of hydraulic fluid into the stuffing box 12.

Likewise the upward movement of the piston 14 draws lubricant into contact with the upper seal ring 50. If the lower seal ring 52 is performing properly, the upper seal ring will tend to dry out. The lubricant carried upward by the piston 14 reduces the friction between the piston 14 and the upper seal ring 50, thereby increasing the life of the seal and reducing vibration and noise otherwise caused by friction between the piston 14 and the seal 50.

Referring now to FIG. 3, although any type of enclosed fluid reservoir may be used, the lubrication reservoir 20 of the present invention preferably is of a type having a clear upper housing 80 with a spring 82 for exerting metered pressure on a diaphragm 84. The spring applies continuous pressure to the diaphragm 84, forcing lubricant from a bowl 88 of the reservoir 20 through the coupling 24 and the check valve 22 at a pressure less than the trigger pressure of the relief valve 26, thereby allowing for a continuous flow of lubricant, at a low rate, into the stuffing box 12 while preventing escape of lubricant through the relief valve 26. Lubricant is added to the lubrication reservoir 20 through the fitting 32, preferably a zerk valve, located in the bowl 88 of the reservoir 20. Preferably, the reservoir 20 has a five to six ounce capacity, requiring it to be refilled as infrequently as approximately once a month.

As the piston becomes impregnated with the lubricant, less lubricant is used requiring the reservoir to be refilled less often than once a month. Thus the stuffing box lubricator 10 of the present invention reduces the time and cost of maintenance required to keep the elevator piston properly lubricated, extends the life of the seal rings to reduce elevator down time and the time and costs associated with seal failure, and reduces the noise and rough, jerky movement of the elevator caused by improper lubrication of the piston.

Although preferred embodiments of the invention have been illustrated in the accompanying Drawings and described in the foregoing Detailed Description, it will be understood that the invention is not limited to the embodiments disclosed, but is capable of numerous rearrangements and modifications of parts and elements without departing from the spirit of the invention.

I claim:

1. Apparatus for lubricating a piston through a stuffing box having a lantern ring sandwiched between dual seal rings comprising:
   a pressure lubrication reservoir for supplying a first fluid comprising fresh lubricant to the piston;
   means for adding the first fluid to the lubrication reservoir;
   means for connecting the lubrication reservoir to the stuffing box for directing the first fluid flow from the lubrication reservoir into the piston;
   means for discharging a second fluid comprising spent lubricant, spent hydraulic fluid, or condensate under a predetermined pressure out of the stuffing box;
   means for preventing the flow of the second fluid from the stuffing box into the pressure lubrication reservoir as the second fluid is discharged under pressure from the stuffing box; and
   means for preventing the discharge through the discharge means of the first and second fluids the first fluid it flows from the lubrication reservoir to the stuffing box under pressures less than the predetermined pressure.

2. Apparatus for lubricating an elevator piston comprising:
   a pressure lubrication reservoir for continuous metered supplying of a first fluid comprising fresh lubricant to the piston;
   a fitting in the lubrication reservoir for adding fresh lubricant to the lubrication reservoir;
   a hydraulic cylinder associated with and surrounding the piston;
   a stuffing box having a wall and mounted on the cylinder for sealing the cylinder and surrounding the piston in slidable sealed contact with the surface of the piston for hydraulically actuated bidirectional movement of the piston through the stuffing box;
   a lantern ring positioned within the stuffing box and surrounding the piston to allow fluid flow into and out of the stuffing box;
   at least one seal ring positioned parallel to the lantern ring within the housing and surrounding and in sealed contact with the surface of the piston to prevent hydraulic fluid from flowing from the cylinder into the stuffing box;
   a port located in the stuffing box wall at a point adjacent to and in flow alignment with the lantern ring;
   means for connecting the stuffing box to the lubrication reservoir through the port;
   a discharge means connected to the stuffing box through the port for discharging a second fluid comprising spent lubricant, spent hydraulic fluid, or condensate from the stuffing box;
   a check valve in flow alignment between the lubrication reservoir and the stuffing box for allowing flow of the first fluid from the reservoir to the stuffing box and preventing the return flow of the second fluid from the stuffing box into the lubrication reservoir; and
   a safety valve connected to the discharge means and in flow alignment with the stuffing box to allow controlled discharge of the second fluid from the stuffing box.

3. Apparatus for lubricating a piston through a stuffing box comprising:
   a pressure lubrication reservoir for continuously supplying a first fluid comprising fresh lubricant to the piston;
   means for adding the first fluid to the lubrication reservoir;
   means for connecting the lubrication reservoir to the stuffing box for flow of the first fluid from the lubrication reservoir to the piston;
   means for discharging a second fluid comprising spent lubricant, spent hydraulic fluid, or condensate under predetermined pressure from the stuffing box through a portion of the means connecting the lubrication reservoir to the stuffing box;
   means for preventing the flow of the second fluid from the stuffing box into the lubrication reservoir as the second fluid is discharged from the stuffing box; and
   means for preventing the discharge of the first and second fluids through the discharge means as the first fluid flows from the lubrication reservoir to the stuffing box under pressures less than the predetermined pressure.

4. The apparatus for lubricating a piston of claim 1, wherein the means for preventing the flow of the second fluid from the stuffing box into the pressure lubrication reservoir further comprises a check valve in the means connecting the lubrication reservoir to the stuffing box.

5. The apparatus for lubricating a piston of claim 4, wherein the means for discharging the second fluid from the stuffing box further comprises a discharge outlet in the means connecting the lubrication reservoir to the stuffing box, with the discharge outlet located between the check valve and the stuffing box.

6. The apparatus for lubricating a piston of claim 5, wherein the means for preventing the discharge of the first and second fluids as the first flows from the lubrication reservoir to the stuffing box further comprises a safety valve in the discharge outlet gauged for release under pressures exceeding that of the pressure lubrication reservoir.

7. The apparatus for lubricating a piston of claim 3, wherein the means for preventing the flow of the second fluid from the stuffing box into the pressure lubrication reservoir further comprises a check valve in the means connecting the lubrication reservoir to the stuffing box.

8. The apparatus for lubricating a piston of claim 7, wherein the means for discharging the second fluid from the stuffing box further comprises a discharge outlet in the means connecting the lubrication reservoir to the stuffing box, with the discharge located between the check valve and the stuffing box.

9. The apparatus for lubricating a piston of claim 8, wherein the means for preventing the discharge of the first and second fluids as the first fluid flows from the lubrication reservoir to the stuffing box further comprises a safety valve in the discharge outlet gauged for release under pressures exceeding that of the pressure lubrication reservoir.

* * * * *